United States Patent
Tsai et al.

(10) Patent No.: US 7,551,240 B2
(45) Date of Patent: Jun. 23, 2009

(54) ELECTROSTATIC DISCHARGE (ESD) PROTECTION CIRCUIT INTEGRATED WITH CELL TEST FUNCTION

(75) Inventors: Yi-Cheng Tsai, Budai Township, Chiayl County (TW); Wen-Chun Wang, Taichung (TW)

(73) Assignee: Wintek Corporation, Taichung (TW)

( * ) Notice: Subject to any disclaimer, the term of this patent is extended or adjusted under 35 U.S.C. 154(b) by 280 days.

(21) Appl. No.: 11/798,228

(22) Filed: May 11, 2007

(65) Prior Publication Data

US 2007/0268420 A1  Nov. 22, 2007

(30) Foreign Application Priority Data

May 17, 2006  (TW) .............................. 95117530 A

(51) Int. Cl.
G02F 1/1333 (2006.01)
H01L 31/00 (2006.01)
(52) U.S. Cl. .............................. 349/40; 257/59; 257/72
(58) Field of Classification Search .................... 349/40
See application file for complete search history.

(56) References Cited

U.S. PATENT DOCUMENTS

| | | | | |
|---|---|---|---|---|
| 6,613,650 B1* | 9/2003 | Holmberg | .................... | 438/438 |
| 6,690,433 B2* | 2/2004 | Yoo et al. | .................... | 349/40 |
| 6,753,836 B2* | 6/2004 | Kwon | .......................... | 345/87 |
| 2004/0032544 A1* | 2/2004 | Kim et al. | .................... | 349/40 |
| 2005/0225689 A1* | 10/2005 | Park et al. | ..................... | 349/40 |
| 2005/0285984 A1* | 12/2005 | Tsai et al. | .................... | 349/40 |
| 2006/0279667 A1* | 12/2006 | Tsai et al. | .................... | 349/40 |

\* cited by examiner

*Primary Examiner*—Michelle R Connelly Cushwa
(74) *Attorney, Agent, or Firm*—Rabin & Berdo, PC.

(57) ABSTRACT

A flat display including a display panel is disclosed. The display panel includes several signal lines and ESD protection circuits whose negative ESD protection circuits have cell test function. When a driving IC bonds to the display panel, the system operates in a normal dynamic display mode, and the negative ESD protection circuits are coupled to a low-level voltage such that thin film transistors of the negative ESD protection circuit are switched off in the normal display mode. Therefore, the power consumption of the panel module can be reduced and using time of the products can be improved.

25 Claims, 5 Drawing Sheets

200

ELECTROSTATIC DISCHARGE (ESD) PROTECTION CIRCUIT INTEGRATED WITH CELL TEST FUNCTION

This application claims the benefit of Taiwan application Serial No. 95117530, filed MAY 17, 2006, the subject matter of which is incorporated herein by reference.

BACKGROUND OF THE INVENTION

1. Field of the Invention

The invention relates in general to a flat display and display panel thereof, and more particularly to a flat display with a cell test function, which can reduce power consumption of an ESD protection circuit in a normal dynamic display mode.

2. Description of the Related Art

FIG. 1A shows a conventional ESD protection circuit. Referring to FIG. 1A, a thin film transistor (TFT) display panel 100 includes a positive ESD protection circuit 112 and a negative ESD protection circuit 114 coupled to each of signal lines 110 (scan lines or data lines) for respectively discharging positive and negative electrostatic charges generated as a driving chip 120 is bonded to the display panel 100. The negative ESD protection circuit 114 includes a diode-connected TFT transistor M. The source of the TFT transistor M is coupled to the signal line 110 and the gate and drain of the TFT transistor M are coupled to a common electrode (having a common voltage Vcom) of the display panel 100.

The driving chip 120 (scan or data driving chip) couples to the signal-line bump of the display panel 100 at module process. In the process when the driving chip 120 bonds to the display panel 100, the negative electrostatic charges generated on the signal lines 110 can be transmitted to the common electrode Vcom for discharge via the transistor M so as to prevent the negative electrostatic charges from flowing into the signal lines 110 and damaging TFT devices of the display panel 100.

However, for example, the signal lines 110 are scan lines. When the display panel 100 bonds to the driving chip 120 for operating in a normal dynamic display mode, as shown in FIG. 1B, in a period T1, the driving chip 120 outputs a scan signal Scan1 with a voltage Vgh, such as +10V, via the first-stage scan signal line 110 and in the same period T1, the scan signal on the second-stage scan signal line 110 has a low voltage Vgl, such as −10V, in the meanwhile the common voltage Vcom has an AC voltage Vch, such as +5V. Therefore, the TFT transistor M coupled to the first-stage scan signal line 110 is turned off because its negative-electrode voltage (=Vgh) is higher than its positive-electrode voltage (=Vch). Besides, the TFT transistors M of other scan signal lines 110 are turned on to generate currents I, which increases the power consumption as shown in FIG. 1A because their negative-electrode voltage Vgl (=−10V) are lower than their positive-electrode voltage Vch or Vcl (0V).

Supposed there are N scan lines in a panel, there would be power-consuming currents (N−1)*I flowing by the negative ESD protection circuits in the period T1. Similarly, in the period T2, only the TFT transistor M of the second stage scan signal line 110 is turned off and the other (N−1) TFT transistors M are all turned on, which generates (N−1)*I power-consuming currents through the negative ESD protection circuits. Therefore, although the conventional negative ESD protection circuits 114 can achieve the purpose of ESD protection, these protection circuits 114 increase power consumption of the display panel 100 in a dynamic display mode.

SUMMARY OF THE INVENTION

It is therefore an object of the invention to provide a flat display and display panel thereof. When the display panel operates in a normal dynamic display mode, a low-level pin of the driving chip is coupled to one terminal of each negative ESD protection circuit to prevent generation of a power-consuming path, thereby reducing power consumption of the display panel.

The invention achieves the above-identified object by providing a display panel for bonding to a driving integrated circuit (IC). The display panel includes a number of signal lines and negative ESD protection circuits. The negative ESD protection circuits are respectively coupled to the signal lines. The negative ESD protection circuits have first ends coupled to the corresponding signal lines, second ends coupled to each other, and ESD terminals coupled to each other. When the driving IC bonds to the display panel, negative electrostatic charges generated on each of the signal lines are transmitted to the ESD terminal via the first end of the corresponding negative ESD protection circuit and further transmitted from the ESD terminals of the other negative ESD protection circuits to the corresponding first ends for discharge, and the second ends of the negative ESD protection circuits are coupled to a low-level pin of the driving IC.

The invention achieves the above-identified object by providing a flat display including a display panel and a driving IC. The display panel includes a number of signal lines and negative ESD protection circuits. The negative ESD protection circuits are respectively coupled to the signal lines. The negative ESD protection circuits have first ends coupled to the corresponding signals, second ends coupled to each other, and ESD terminals coupled to each other. The driving IC is for coupling to the signal lines as bonding to the display panel, wherein the driving IC has a low-level pin. When the driving IC bonds to the display panel, negative electrostatic charges generated on each of the signal lines are transmitted to the ESD terminal via the first end of the corresponding negative ESD protection circuit and further transmitted from the ESD terminals of the other negative ESD protection circuits to the corresponding first ends for discharge, and the second ends of the negative ESD protection circuits are coupled to the low-level pin of the driving IC.

Other objects, features, and advantages of the invention will become apparent from the following detailed description of the preferred but non-limiting embodiments. The following description is made with reference to the accompanying drawings.

DETAILED DESCRIPTION OF THE INVENTION

Figure 1A:
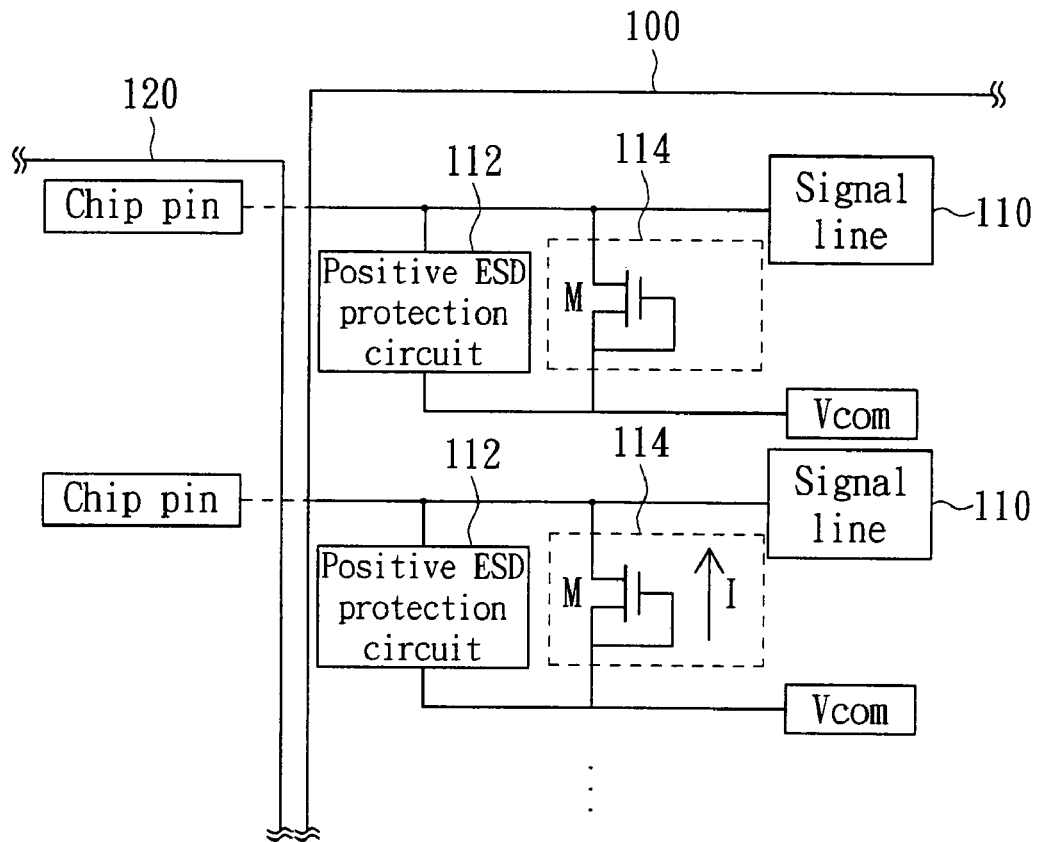
FIG. 1A shows a conventional ESD protection circuit.
Figure 1B:
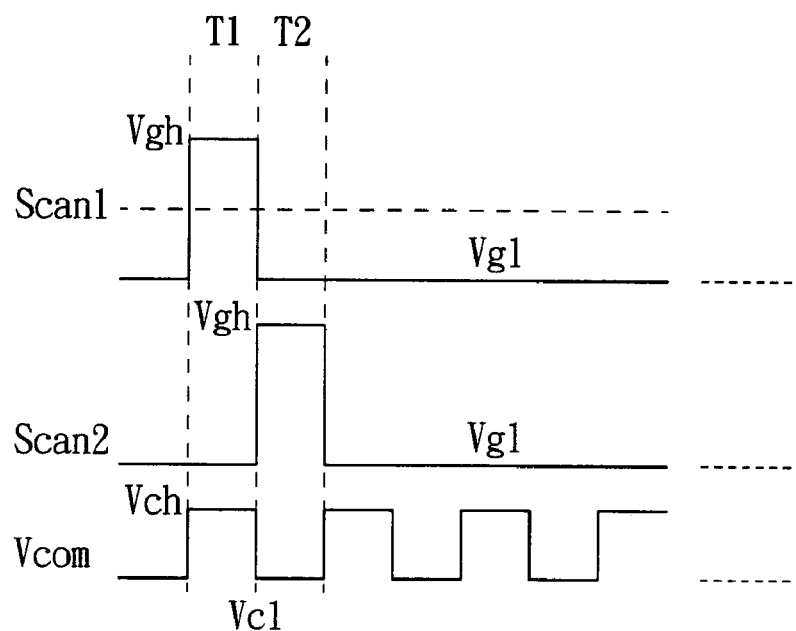
FIG. 1B is a timing diagram of a scan driving operation in the TFT display panel of FIG. 1A.
Figure 2:
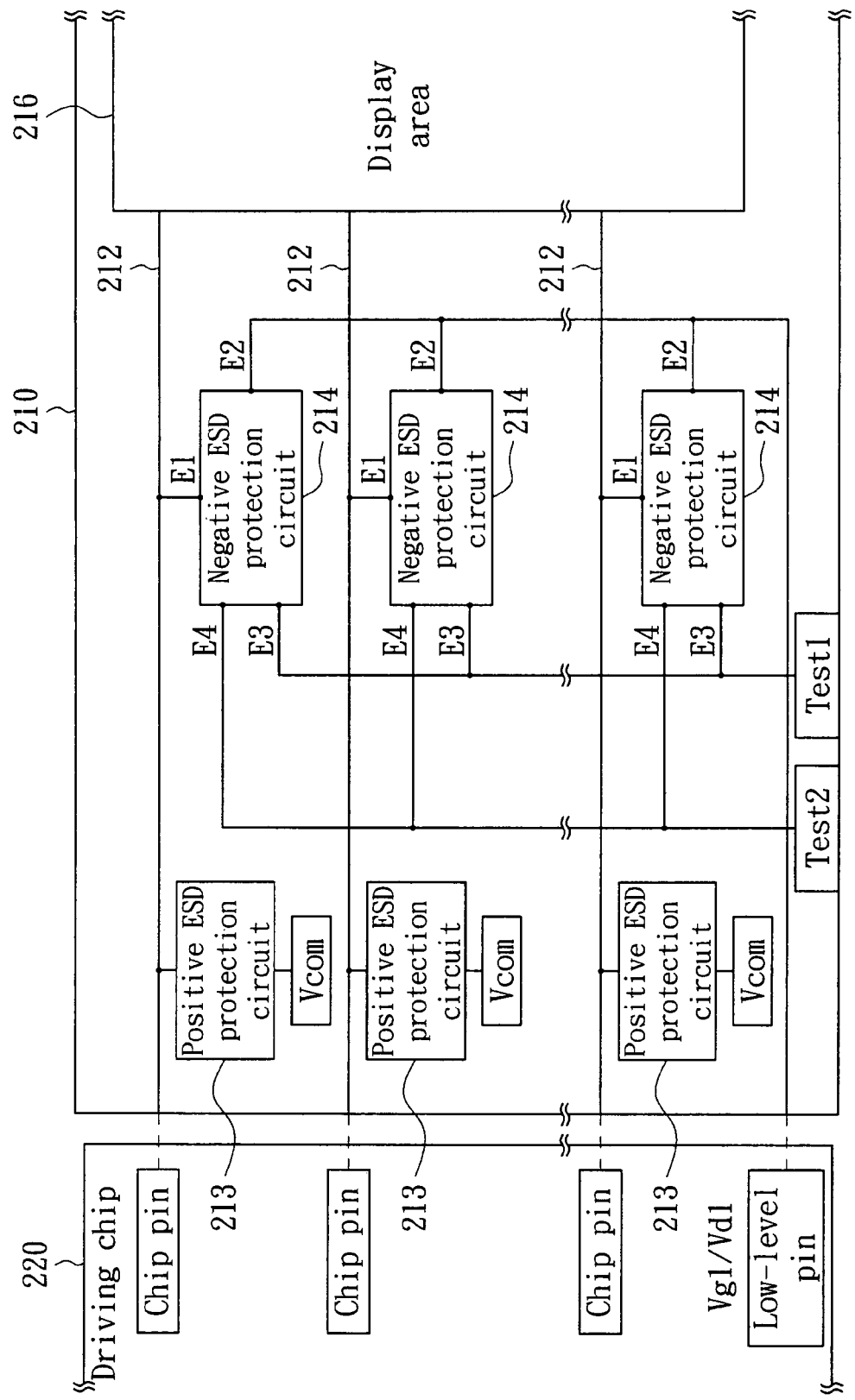
FIG. 2 is a block diagram of a flat display according to a preferred embodiment of the invention.

Referring to FIG. 2, a block diagram of a flat display according to a preferred embodiment of the invention is shown. A flat display 200, such as a liquid crystal display, includes a display panel 210 and a driving chip 220. The display panel 210, such as a TFT panel, includes a number of signal lines 212, positive ESD protection circuits 213 and negative ESD protection circuits 214, and a display area 216. The signal lines 212 are scan lines or data lines and the driving chip 220 is a scan or data driving chip. Each positive ESD protection circuit 213 is coupled between a signal line 212 and a common electrode (having a common voltage Vcom), mainly for discharging positive electrostatic charges generated as the driving IC 220 bonds to the display panel 210.

The negative ESD protection circuits 214 have the first ends E1 coupled to the corresponding signal lines 212 and the second ends E2 coupled to each other. Besides, ESD terminals E4 of the negative ESD protection circuits 214 are also coupled to each other. When the driving chip 220 is bonded to the display panel 210, the pins of the driving chip 220 are respectively coupled to the signal lines 212 for providing the required driving signals (scan signals or data signals) for pixel display in the display area 216. Each negative ESD protection circuit 214 has a common-connection terminal E2 coupled to a low-level pin of the driving chip 220.

Before the driving chip 220 bonds to the display panel 210, the negative electrostatic charges generated on each signal line 212 can be transmitted to the ESD terminal E4 from the first end E1 of the corresponding negative ESD protection circuit 214 and then transmitted via the ESD terminals E4 of other negative ESD protection circuits 214 to the corresponding first ends E1 for discharge. That is, when negative electrostatic charges are generated on each signal line 212, the corresponding negative ESD protection circuit 214 is used to conduct all the other signal lines 212 for discharging the negative electrostatic charges. When the display panel 210 bonds to the driving chip 220 to operate the display area 216 in a normal dynamic display mode, the driving chip 220 outputs a low voltage (such as a low-level scan or data voltage Vgl or Vdl) to the second end E2 of each negative ESD protection circuit 214 via the low-level pin to turn off the negative ESD protection circuits 214. By doing this, the power consumption of the display panel 210 can be reduced.

In additions, each negative ESD protection circuit 214 has a third end E3 coupled to a first test point Test 1 of the display panel 210 and the ESD terminal E4 coupled to a second test point Test 2 of the display panel 210. The test points Test1 and Test2 are for performing a cell test function on the display panel 210 before the driving chip 220 bonds to the display panel 210.

Figure 3A:
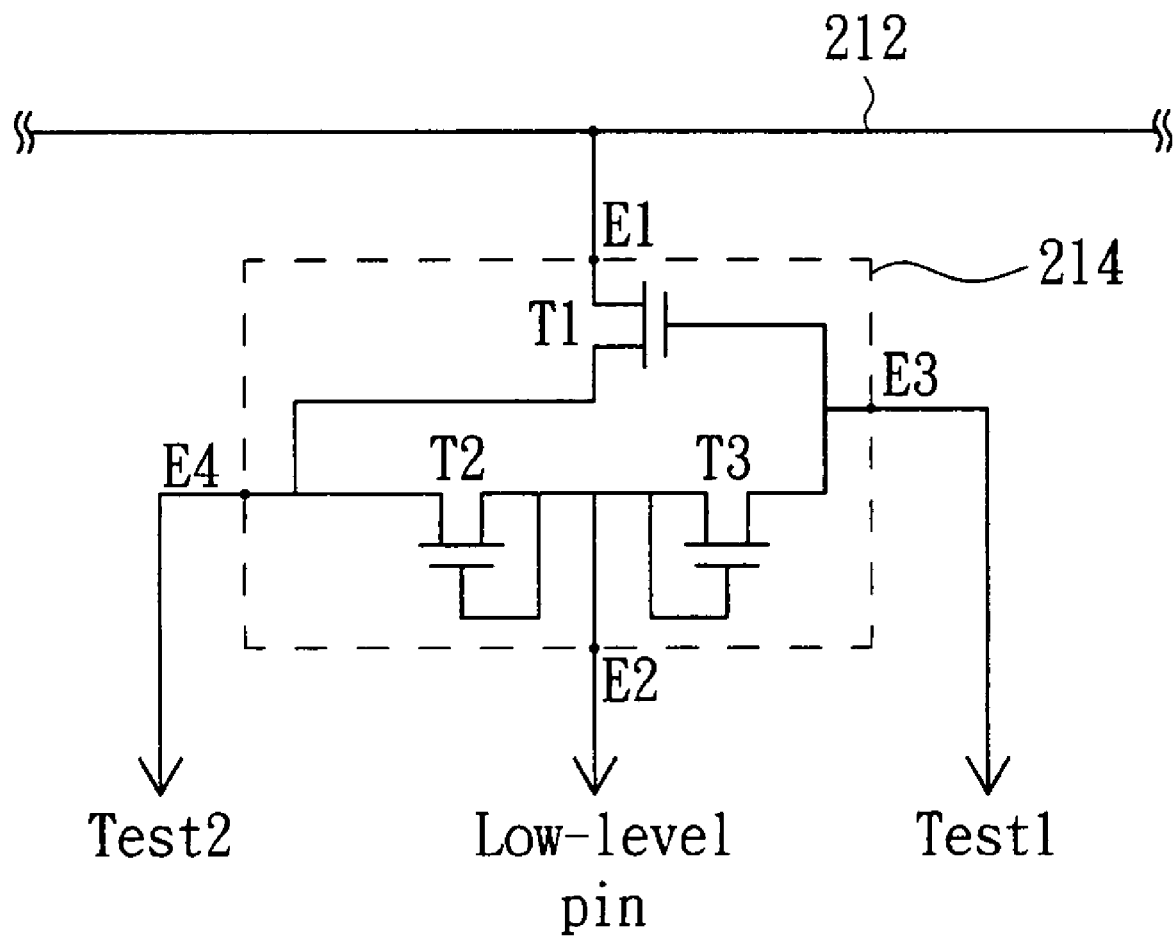
FIG. 3A is a circuit structure diagram of the negative ESD protection circuit in FIG. 2.

Referring to FIG. 3A, a circuit embodiment of the negative ESD protection circuit 214 in FIG. 2 is shown. Each negative ESD protection circuit 214 includes a TFT transistor T1, such as a NMOS transistor, and diode-connected TFT transistors T2 and T3. The TFT transistor T1 has a source (i.e. the end E1) coupled to the corresponding signal line 212, a gate coupled to a negative end of the diode-connected TFT transistor T3 as the end E3 of the negative ESD protection circuit 214 and a drain coupled to a negative end of the diode-connected TFT transistor T2 as the ESD terminal E4 of the negative ESD protection circuit 214. Moreover, the diode-connected TFT transistor T2 has a positive end coupled to a positive end of the diode-connected TFT transistor T3 as the end E2 of the negative ESD protection circuit 214. As mentioned above, the ends E3 of the negative ESD protection circuits 214 are commonly coupled to the first test point Test1 and the ESD terminals (E4) of the negative ESD protection circuits 214 are commonly coupled to the second test point Test2.

Figure 3B:
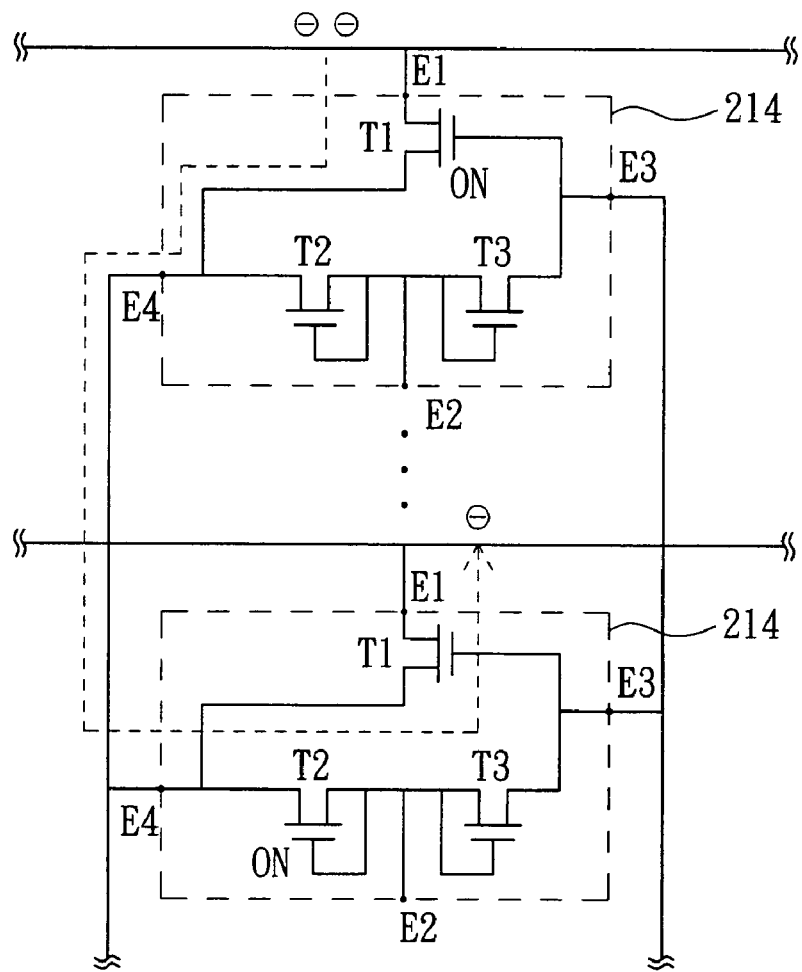
FIG. 3B is a schematic diagram of a discharge path for negative electrostatic charges formed in the negative ESD protection circuit as the display panel bonds to a driving IC according to the preferred embodiment of the invention.

First, in terms of negative ESD protection, for example, negative charges (−) are generated when the driving chip bonds to the panel, they are transmitted to the signal line through the pins of the driving chip such that the corresponding TFT transistor T1 has its source voltage smaller than its gate voltage by at least a threshold voltage (such as 2V). Therefore, the transistor T1 is turned on to have a negative voltage level at the ESD terminal E4. As shown in FIG. 3B, because the ESD terminals E4 of the negative ESD protection circuits 214 are coupled to each other, negative electrostatic charges (−) of each stage of signal lines 212 are propagated via the transistor T1 of the corresponding negative ESD protection circuit 214. Also, the voltage level of the terminal E4 is smaller at least one threshold voltage than that of the terminal E3, and the transistors T1 are turned on in other stages of the negative ESD protection circuit 214. Therefore, the generated negative electrostatic charges can be discharged through the whole panel.

Figure 3C:
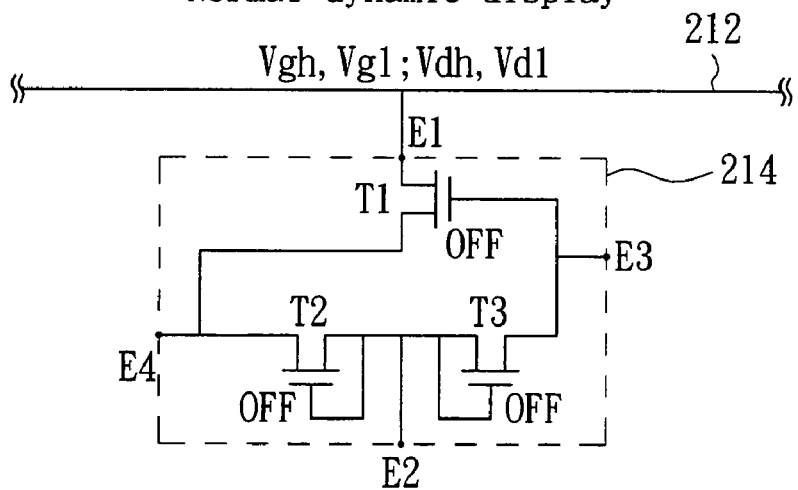
FIG. 3C is a schematic diagram of the negative ESD protection circuit in a turn-off state when the display panel operates in a normal dynamic display mode according to a preferred embodiment of the invention.
Figure 4:
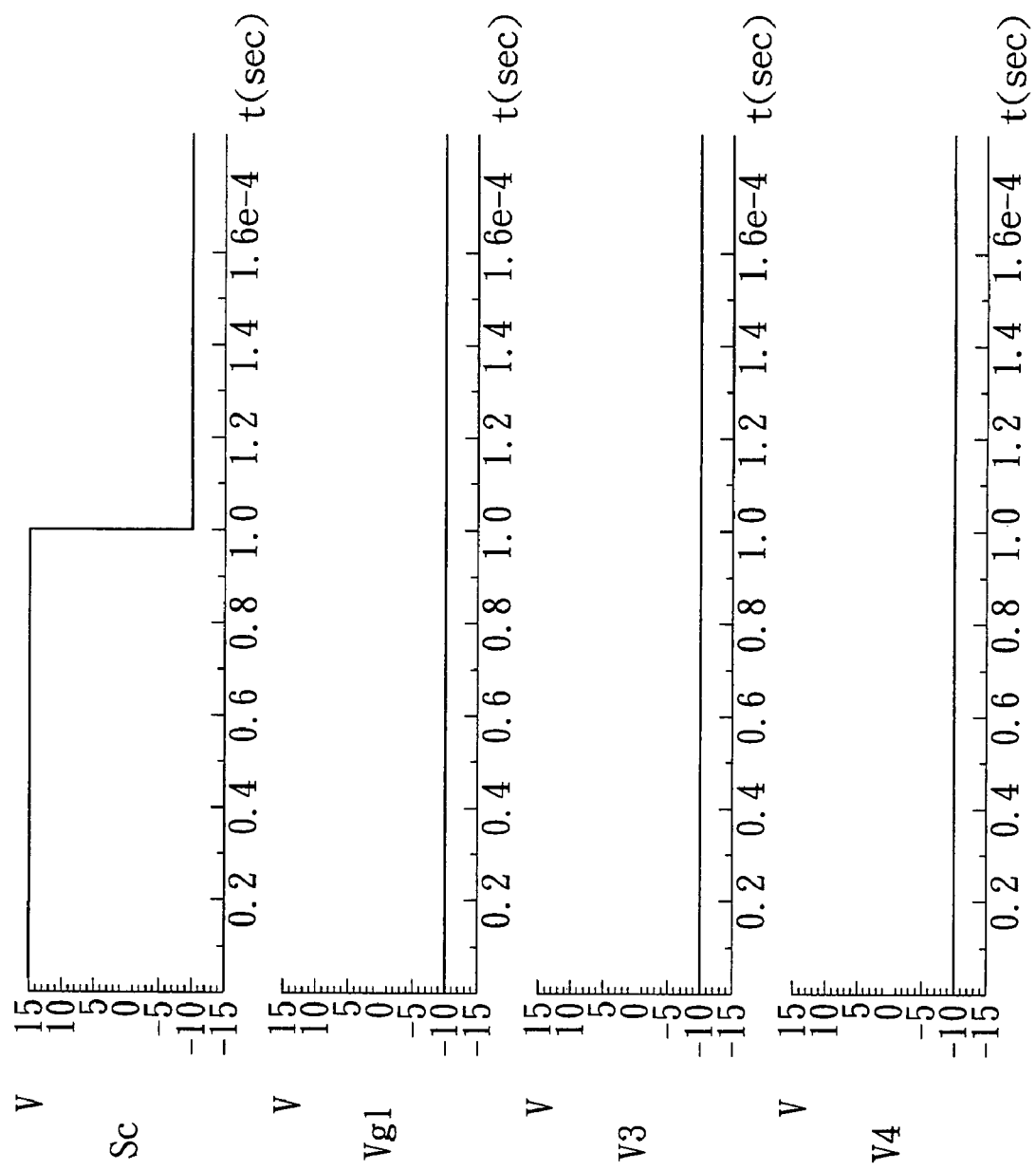
FIG. 4 is a stimulation timing diagram of the display panel in a normal dynamic display mode according to the preferred embodiment of the invention.

Secondly, in terms of reduction of panel power consumption, as shown in FIG. 2, when the display panel 210 bonds to the scan (or data) driving chip 220 to operate the display area in a normal dynamic display mode, the scan (or data) driving chip 220 supplies a low voltage Vgl (or Vdl) to the end E2 of each negative ESD protection circuit 214 via its low-level pin. As shown in FIG. 3C, owing that the transistors T2 and T3 are both diode-connected, the voltages at the ends E3 and E4 are both equal to the voltage Vgl or Vdl at the end E2. At the time, all the negative ESD protection circuits 214 are turned off, thereby reducing power consumption of the display panel 210. As shown in FIG. 4, a circuit stimulation result shows that when the display panel 210 has resolution 128*160, the scan signal Sc has the high voltage Vgh equal to +15V, and the low voltage Vgl equal to −10V, the voltage V3 at the end E3 and the voltage V4 at the end E4 are both close to the voltage Vgl (=−10V). It demonstrates that in the normal dynamic display mode, the transistors T1, T2 and T3 of each negative ESD protection circuit 214 are turned off.

Besides, the low-level voltage supplied by the above-mentioned driving chip 220 via its low-level pin can also be a voltage other than the low-level scan (or data) voltage Vgl or Vdl. As long as the low-level pin can be used to output a low voltage to turn off the negative ESD protection circuit 214 in the dynamic display mode, all the alternatives are not apart from the scope of the invention.

Thirdly, in terms of a cell test function, for example, the signal lines 212 are scan lines, the negative ESD protection circuits 214 shown in FIG. 2 and FIG. 3A are coupled to the scan signal lines 212 of the display panel 210. A test voltage Vt, such as +25V is inputted to the first test point Test1 of the negative ESD protection circuit 214 of each scan signal line 212 and a scan signal voltage Vgh equal to +15V is supplied to the second test point Test2 of the negative ESD protection circuits 214 of the corresponding scan signal line, and then a data signal voltage Vdh equal to +5V is supplied to the corresponding data line to test a frame-display function of the display panel 210, wherein the test voltage Vt is higher than the scan voltage Vgh by at least a threshold voltage of the transistor T1.

As shown in FIG. 3A, owing that the transistor T1 of the negative ESD protection circuit 214 of the scan signal line 212 has a gate voltage (i.e. a voltage at the end E3) equal to the test voltage (+25V) and a drain voltage (i.e. a voltage at the end E4) equal to the high voltage Vgh (+15V), the transistor T1 of the corresponding scan signal line 212 is turned on and the scan voltage Vgh is inputted to each stage of scan signal lines 212 and forwarded to the display area 216, which enables pixels of the display area 216 to receive data signals from the corresponding data lines to generate the corresponding display frame. By doing this, whether the display panel 210 has line defects or broken circuits can be tested to reduce material waste and thus production cost.

Although the signal lines 212 are exemplified to be scan lines in the above cell test function, similarly, the negative ESD protection circuits 214 as shown in FIG. 2 and FIG. 3A can also be coupled to the data signal lines 212. The test voltage Vt (+25V) is inputted to the first test point Test1 of the negative ESD protection circuit 214 of each data signal line 212, and the data signal voltage Vdh (+5V) is supplied to the second test point Test2 of the corresponding data signal lines 212, and then a scan signal with a voltage Vgh equal to +15V is supplied to the corresponding scan lines to test a frame display function of the display panel 210, wherein the test voltage Vt is higher than the data voltage Vdh by at least a threshold voltage of the transistor T1. It can be reasoned by analogy that because the transistor T1 of the negative ESD protection circuit 214 of each data signal line 212 has a gate voltage (+25V) higher than a drain voltage (+5V), when the scan signal is transmitted to the display area 216, the transistor T1 of the corresponding data signal line 212 is turned on to transmit the data voltage Vdh to the pixels of the display area 216 to generate the required display frame. Therefore, whether the display panel 210 has line defects or broken circuits can be tested to reduce material waste and thus production cost.

In the above cell test function, both of the scan signal lines 212 and the data signal lines 212 can also include the negative ESD protection circuits 214 as shown in FIG. 2 and FIG. 3A. The test voltage Vt (+25V) is simultaneously inputted to the first test points Test1 of the negative ESD protection circuits 214 of the scan signal lines 212 and the data signal lines 212, the scan signal with a voltage Vgh equal to +15V is supplied to the second test points Test2 of the corresponding scan signal lines 212, and the data signal with a voltage Vdh equal to +5V is supplied to the corresponding data signal lines 212 to test the frame display function of the display panel 210. In this way, whether the display panel 210 has line defects or broken circuits can be similarly tested to achieve the purpose of reducing production cost, and thus any details is not necessary to be given here.

Besides, in the cell test function, it can separately test the odd (or even) numbers of the scan lines and the data lines of the display panel 210 to determine whether the panel 210 is a bad product. That is, the odd-stage and even-stage signal lines 212 are respectively performed a frame driving test. Or it can respectively test the red/green/blue pixel data lines to determine if the panel 210 is a bad product.

As mentioned above, although the negative ESD protection circuit 214 is exemplified to include a TFT transistor T1 and diode-connected TFT transistors T2 and T3 in the invention, the display panel 210 can also use other types of negative. ESD protection circuits to discharge negative electrostatic charges on each stage of signal lines. As long as the negative ESD protection circuits have the first ends coupled to the corresponding signal lines and the second ends coupled to each other such that the negative electrostatic charges generated as the driving chip bonds to the display panel can be discharged from the second ends of the turned-on negative ESD protection circuits and after the driving chip bonds to the display panel, the second ends of the negative ESD protection circuits are commonly coupled to the low-level pin of the driving chip such that a low voltage can be supplied from the low-level pin of the driving chip to the second end of each negative ESD protection circuit to turn off the negative ESD protection circuits in a normal dynamic display mode to achieve the purpose of reducing power consumption of the panel, all the alternatives will not depart from the scope of the invention.

The flat display and display panel thereof disclosed by the above embodiment of the invention has the following advantages:

1. When the driving chip bonds to the display panel, the common-connection terminals of the negative ESD protection circuits of each signal line are coupled to the low-level pin of the driving chip and thus when the display panel is operated in a normal dynamic display mode, the driving IC can supply a low voltage via the low-level pin to the common-connection terminal of each negative ESD protection circuit such that all the negative ESD protection circuits are turned off in the whole process of frame display. Therefore, the panel power consumption can be effectively reduction to improve production lifetime.

2. When the driving chip is bonded to the display panel, negative electrostatic charges generated on each signal line can be transmitted to the common-connection terminal of the corresponding negative ESD protection circuit for discharge to achieve the purpose of ESD protection.

3. A driving display test can be performed on the display panel of the invention by using the first test points and the second test points of the negative ESD protection circuits of the scan lines and data lines to ensure whether the display panel is a bad production in order to reduce material cost of the driving chip.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A display panel, for bonding to a driving integrated circuit (IC), the display panel comprising:
    a plurality of signal lines; and
    a plurality of negative electrostatic discharge (ESD) protection circuits, respectively coupled to the signal lines, wherein the negative ESD protection circuits have first ends coupled to the corresponding signal lines, second ends coupled to each other, and ESD terminals coupled to each other;
    wherein when the driving IC bonds to the display panel, negative electrostatic charges generated on each of the signal lines are transmitted to the ESD terminal via the first end of the corresponding negative ESD protection circuit and further transmitted from the ESD terminals of the other negative ESD protection circuits to the corresponding first ends for discharge, and the second ends of the negative ESD protection circuits are coupled to a low-level pin of the driving IC.

2. The display panel according to claim 1, wherein each of the signal lines is a scan line and the driving IC is a scan driving IC.

3. The display panel according to claim 1, wherein each of the signal lines is a data line and the driving IC is a data driving IC.

4. The display panel according to claim 1, wherein when the display panel operates in a normal dynamic display mode, the driving IC outputs a low voltage to the second ends to turn off the negative ESD protection circuits via the low-level pin.

5. The display panel according to claim 4, wherein the low voltage is a low voltage of a driving signal outputted by each of the signal lines of the driving IC.

6. The display panel according to claim 1, wherein each of the negative ESD protection circuits comprises a N-type metal oxide semiconductor (NMOS) transistor, a first diode device and a second diode device, the NMOS transistor has a source coupled to the corresponding signal line, a drain coupled to a negative end of the first diode device as the ESD terminal, and a gate coupled to a negative end of the second diode device, the first diode device has a positive end coupled to a positive end of the second diode device, and a coupling point of the positive ends of the first diode device and the second diode device is used as the second end of the negative ESD protection circuit.

7. The display panel according to claim 6, wherein each of the first diode device and the second diode device is a diode-connected NMOS transistor.

8. The display panel according to claim 6, wherein in a cell test operation, at least a part of NMOS transistors have the gates coupled to a first test point, and the drains coupled to a second test point, the first test point has a test voltage, the second test point has a voltage equal to a high voltage of a driving signal transmitted by each of the signal lines, and the test voltage is higher than the high voltage by at least a threshold voltage of the NMOS transistor.

9. The display panel according to claim 8, wherein the NMOS transistors have the gates coupled together to the first test point and the drains coupled together to the second test point.

10. The display panel according to claim 8, wherein the NMOS transistors coupled to odd-stage (even-stage) signal lines have the gates coupled together to the first test point and the drains coupled together to the second test point.

11. The display panel according to claim 8, wherein the signal lines are data lines and the NMOS transistors coupled to red (green/blue) pixel data lines have the gates coupled together to the first test point and the drains coupled together to the second test point.

12. The display panel according to claim 1, is a thin file transistor (TFT) panel.

13. A flat display, comprising:
a display panel, comprising:
  a plurality of signal lines;
  a plurality of negative ESD protection circuits, respectively coupled to the signal lines, wherein the negative ESD protection circuits have first ends coupled to the corresponding signals, second ends coupled to each other, and ESD terminals coupled to each other; and
a driving IC, for coupling to the signal lines as bonding with the display panel, wherein the driving IC has a low-level pin;
wherein when the driving IC bonds to the display panel, negative electrostatic charges generated on each of the signal lines are transmitted to the ESD terminal via the first end of the corresponding negative ESD protection circuit and further transmitted from the ESD terminals of the other negative ESD protection circuits to the corresponding first ends for discharge, and the second ends of the negative ESD protection circuits are coupled to the low-level pin of the driving IC.

14. The flat display according to claim 13, wherein each of the signal lines is a scan line and the driving IC is a scan driving IC.

15. The flat display according to claim 13, wherein each of the signal lines is a data line and the driving IC is a data driving IC.

16. The flat display according to claim 13, wherein when the display panel operates in a normal dynamic display mode, the driving IC outputs a low voltage to the second ends to turn off the negative ESD protection circuits via the low-level pin.

17. The flat display according to claim 16, wherein the low voltage is a low voltage of a driving signal outputted by each of the signal lines of the driving IC.

18. The flat display according to claim 13, wherein each of the negative ESD protection circuits comprises a NMOS transistor, a first diode device and a second diode device, the NMOS transistor has a source coupled to the corresponding signal line, a drain coupled to a negative end of the first diode device as the ESD terminal, and a gate coupled to a negative end of the second diode device, the first diode device has a positive end coupled to a positive end of the second diode device, and a coupling point of the positive ends of the first diode device and the second diode device is used as the second end of the negative ESD protection circuit.

19. The flat display according to claim 18, wherein each of the first diode device and the second diode device is a diode-connected NMOS transistor.

20. The flat display according to claim 18, wherein in a cell test operation, at least a part of NMOS transistors have the gates coupled to a first test point, and the drains coupled to a second test point, the first test point has a test voltage, the second test point has a voltage equal to a high voltage of a driving signal transmitted by each of the signal lines, and the test voltage is higher than the high voltage by at least a threshold voltage of the NMOS transistor.

21. The flat display according to claim 20, wherein the NMOS transistors have the gates coupled together to the first test point and the drains coupled together to the second test point.

22. The flat display according to claim 20, wherein the NMOS transistors coupled to odd-stage (even-stage) signal lines have the gates coupled together to the first test point and the drains coupled together to the second test point.

23. The flat display according to claim 20, wherein the signal lines are data lines and the NMOS transistors coupled to red (green/blue) pixel data lines have the gates coupled together to the first test point and the drains coupled together to the second test point.

24. The flat display according to claim 13, wherein the display panel is a TFT panel.

25. The flat display according to claim 13, is a liquid crystal display.

* * * * *